(12) United States Patent
Kim (10) Patent No.: US 9,741,284 B2
(45) Date of Patent: Aug. 22, 2017

(54) MOBILE TERMINAL AND METHOD OF DRIVING SAME

(71) Applicant: LG ELECTRONICS INC., Seoul (KR)

(72) Inventor: Sangduck Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/912,378

(22) PCT Filed: Mar. 13, 2014

(86) PCT No.: PCT/KR2014/002112
§ 371 (c)(1),
(2) Date: Feb. 16, 2016

(87) PCT Pub. No.: WO2015/023040
PCT Pub. Date: Feb. 19, 2015

(65) Prior Publication Data
US 2016/0203755 A1   Jul. 14, 2016

(30) Foreign Application Priority Data

Aug. 14, 2013 (KR) .......................... 10-2013-0096660

(51) Int. Cl.
*G09G 3/20*     (2006.01)
*H04B 15/00*    (2006.01)
(Continued)

(52) U.S. Cl.
CPC ............. *G09G 3/2092* (2013.01); *G06T 1/60* (2013.01); *H04B 15/00* (2013.01); *H04W 52/0261* (2013.01); *G09G 2330/023* (2013.01)

(58) Field of Classification Search
CPC .................. G09G 2340/0435; G02F 1/136286
See application file for complete search history.

(56) References Cited

U.S. PATENT DOCUMENTS 8,334,857 B1 *  12/2012  Ogrinc ................... G09G 5/377
                                                    345/204
9,355,585 B2 *  5/2016   Tripathi .................... G09G 3/20
(Continued)

FOREIGN PATENT DOCUMENTS

CN         103473011 A    *  12/2013
KR       10-2007-0033140      3/2007
(Continued)

OTHER PUBLICATIONS

PCT International Application No. PCT/KR2014/002112, Written Opinion of the International Searching Authority dated Jun. 3, 2014, 1 page.

(Continued)

*Primary Examiner* — Gregory J Tryder
*Assistant Examiner* — Yuehan Wang
(74) *Attorney, Agent, or Firm* — Lee, Hong, Degerman, Kang & Waimey (57) ABSTRACT

The present invention relates to a mobile terminal and a method of driving the same. The mobile terminal includes: a display configured to display information; and a controller configured to calculate FPS data indicative of the FPS rate for a running program and control the frame frequency of the display based on the FPS data. The method of driving the mobile terminal includes: displaying information on a display; and calculating FPS data indicative of the FPS rate for a running program and controlling the frame frequency of the display based on the FPS data.

10 Claims, 8 Drawing Sheets

(51) Int. Cl.
    *G06T 1/60*      (2006.01)
    *H04W 52/02*     (2009.01)

(56)            References Cited

U.S. PATENT DOCUMENTS

2008/0055318 A1    3/2008   Glen
2008/0100598 A1    5/2008   Juenger
2008/0198264 A1    8/2008   Balram
2008/0291326 A1*  11/2008   Shishido .............. G09G 3/3611
                                                            348/555
2010/0265933 A1   10/2010   Hijazi et al.
2014/0015787 A1    1/2014   Saitoh et al.
2016/0078838 A1*   3/2016   Huang .................... G09G 3/20
                                                            345/520

FOREIGN PATENT DOCUMENTS

KR    10-2008-0105672      12/2008
KR    10-2011-0044636       4/2011
KR    10-2013-0005807       1/2013
WO       2012137816        10/2012

OTHER PUBLICATIONS

European Patent Office Application Serial No. 14836082.9, Search Report dated Mar. 14, 2017, 9 pages.

* cited by examiner

| FPS data | Dfps |
|---|---|
| - | 40fps |
| camera | 30fps |
| video | 60fps |

MOBILE TERMINAL AND METHOD OF DRIVING SAME

CROSS-REFERENCE TO RELATED APPLICATIONS

This application is the National Stage filing under 35 U.S.C. 371 of International Application No. PCT/KR2014/002112, filed on Mar. 13, 2014, which claims the benefit of earlier filing date and right of priority to Korean Application No. 10-2013-0096660, filed on Aug. 14, 2013, the contents of which are all hereby incorporated by reference herein in their entirety.

TECHNICAL FIELD

The present invention relates to a mobile terminal and a method of driving the same.

BACKGROUND ART

As the features of terminals such as personal computers, laptops, mobile phones, etc. are becoming diverse, those terminals are now implemented as multimedia players with complex functions including taking photos or videos, playing music or video files, gaming, receiving broadcasts, and so on. Terminals may be classified into mobile terminals and stationary terminals according to their mobility.

Most people use their mobile terminals, carrying them around while they are out and about. For this reason, it will be difficult for them to provide electricity to the mobile terminals from external sources. That is, a battery embedded in a mobile terminal is used as a power supply for the mobile terminal. If the user wants to run the mobile terminal for a long time, without gaining power from external sources, the battery's capacity needs to be increased or the mobile terminal's power consumption needs to be reduced.

The mobile terminal has a display module for displaying information processed by it to the user. The display module, among the components of the mobile terminal, consumes a considerably high amount of power. Accordingly, reducing the power consumption of the display module can greatly reduce the power consumption of the mobile terminal.

DISCLOSURE

Technical Problem

The present invention relates to a mobile terminal capable of reducing the power consumption of a display module and a method of driving the same.

Technical Solution

A mobile terminal according to an embodiment of the present invention includes: a display module that displays information; and a controller that calculates FPS data indicative of the FPS rate for a running program and controls the frame frequency of the display module based on the FPS data.

A method of driving a mobile terminal according to an embodiment of the present invention includes: displaying information on a display module; and calculating FPS data indicative of the FPS rate for a running program and controlling the frame frequency of the display module based on the FPS data.

Advantageous Effects

The present invention has the advantage of calculating FPS data indicative of the FPS rate for a currently running program and controlling the frame frequency of the display module based on the FPS data. The present invention can achieve a reduction in the power consumption of the mobile terminal by adjusting the frame frequency of the display module to a lower level when a program that is less sensitive to deterioration in picture quality and can work at a lower frame frequency is run, as the higher the frame frequency of the display module, the higher the picture quality, and the lower the frame frequency of the display module, the lower the power consumption.

BEST MODE FOR CARRYING OUT THE INVENTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

The mobile terminal may include a cellular phone, a smart phone, a laptop computer, a digital broadcasting terminal, personal digital assistants (PDA), a portable multimedia player (PMP), a navigation system and/or so on.

Figure 1:
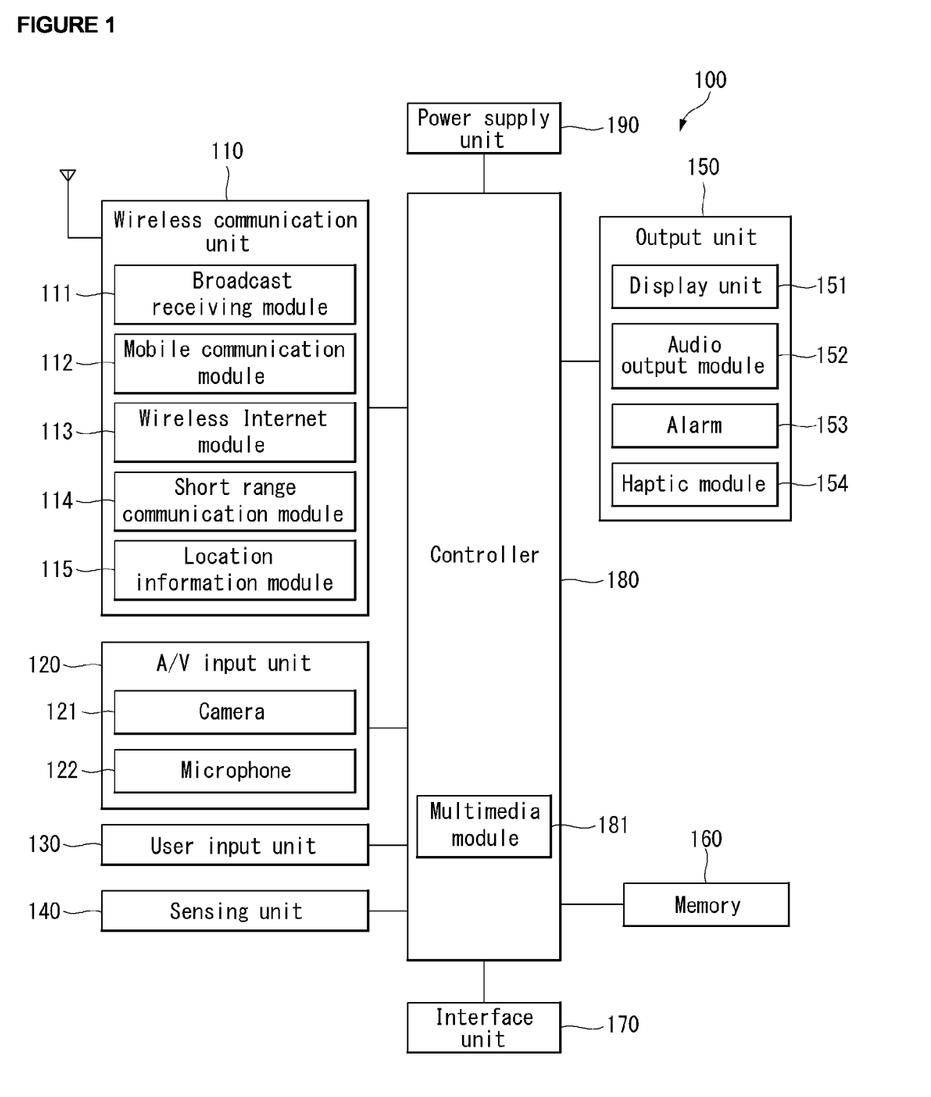
FIG. 1 is a block diagram of a mobile terminal according to an embodiment.

FIG. 1 is a block diagram of a mobile terminal according to an embodiment. Other embodiments, configurations and arrangements may also be provided. As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface 170 is connected to an external device. The sensing unit 140 may also include a proximity sensor. The sensing unit 140 may sense a motion of the mobile terminal 100.

The output unit 150 may generate visual, auditory and/or tactile output, and the output unit 150 may include the display module 151, an audio output module 152, an alarm 153 and a haptic module 154. The display module 151 may display information processed by the mobile terminal 100. The display module 151 may display a user interface (UI) and/or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

The display module 151 may include at least one of a liquid crystal display, a thin film transistor liquid crystal display, an organic light-emitting diode display, a flexible display and/or a three-dimensional display. The display module 151 may be of a transparent type or a light transmissive type. That is, the display module 151 may include a transparent display.

The transparent display may be a transparent liquid crystal display. A rear structure of the display module 151 may also be of a light transmissive type. Accordingly, a user may see an object located behind the body (of the mobile terminal 100) through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display module 151 and a sensor sensing touch (hereafter referred to as a touch sensor) form a layered structure that is referred to as a touch screen, the display module 151 may be used as an input device in addition to an output device.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch. When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images.

The power supply unit 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
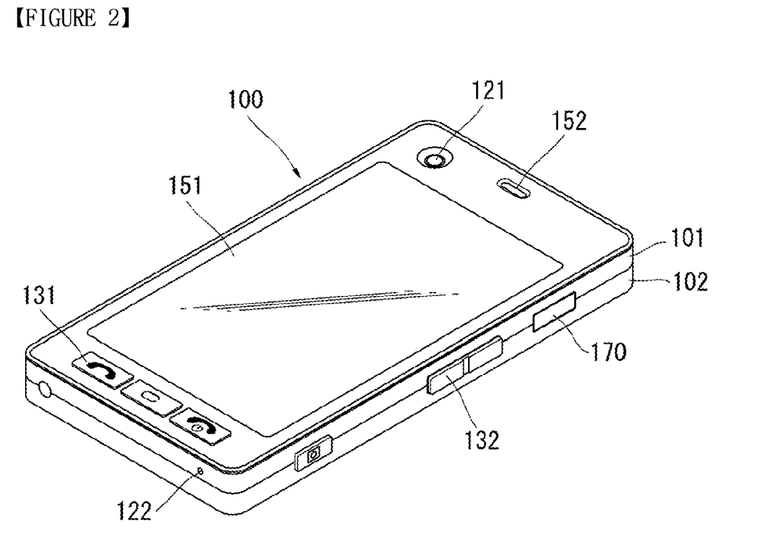
FIG. 2 is a front perspective view of the mobile terminal according to an embodiment.

FIG. 2 is a front perspective view of a mobile terminal (or a handheld terminal) according to an embodiment. The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102. The cases may be formed of plastics through injection molding or made of a metal material such as stainless steel (STS) or titanium (Ti).

The display module 151, the audio output unit 152, the camera 121, the user input unit 130/131 and 132, the microphone 122 and the interface 170 may be arranged (or provided) in the terminal body, and more specifically may be arranged (or provided) in the front case 101.

The display module 151 may occupy most of the main face of the front case 101. The audio output unit 152 and the camera 121 may be arranged in a region in proximity to one of both ends of the display module 151 and the user input unit 131, and the microphone 122 may be located in a region in proximity to another end of the display module 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display module 151 to a touch recognition mode.

Figure 3:
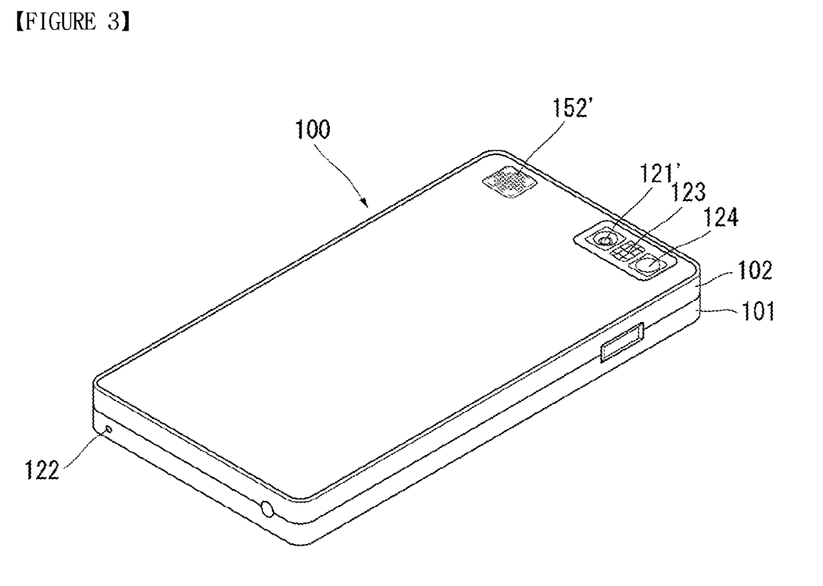
FIG. 3 is a rear perspective view of the mobile terminal according to an embodiment.

FIG. 3 is a rear perspective view of the mobile terminal (shown in FIG. 2) according to an embodiment. Referring to FIG. 2, a camera 121' may be additionally attached to the rear side of the terminal body (i.e., the rear case 102). The camera 121' may have a photographing direction opposite to that of the camera 121 (shown in FIG. 2) and may have pixels different from those of the camera 121 (shown in FIG. 2).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2) and may be used for a speaker phone mode when the terminal is used for a telephone call.

A broadcasting signal receiving antenna may be additionally attached (or provided) to the side of the terminal body in addition to an antenna for telephone calls.

The antenna constructing a part of the broadcasting receiving module 111 (shown in FIG. 1) may be set in the terminal body such that the antenna may be pulled out of the terminal body.

Figure 4:
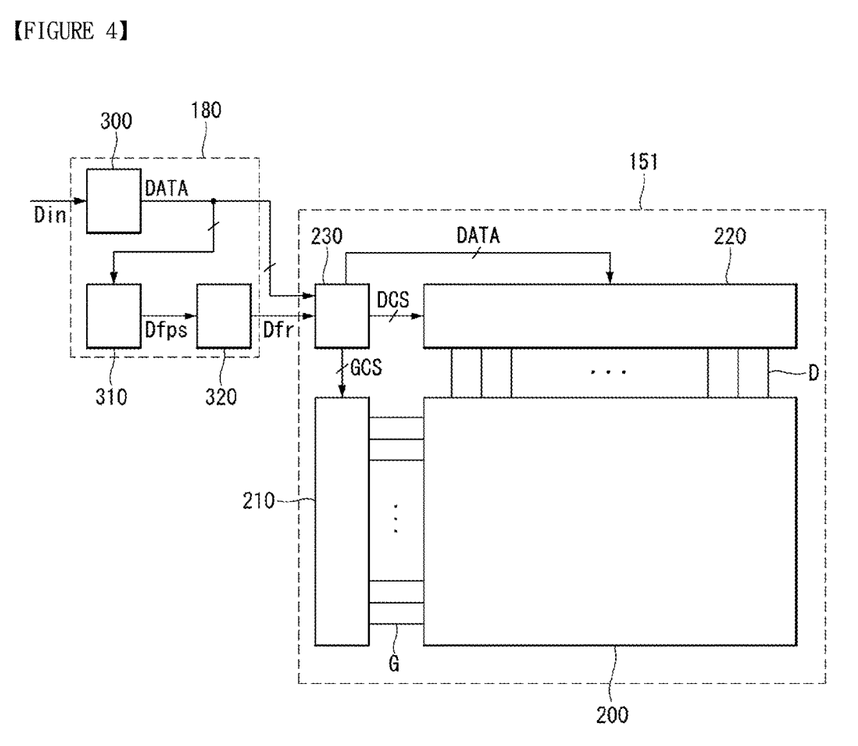
FIG. 4 is a block diagram showing in detail part of a controller and a display module according to a first embodiment of the present invention.

FIG. 4 is a block diagram showing in detail part of a controller and a display module according to a first embodiment of the present invention. Referring to FIG. 4, the controller 180 includes a program execution part 300, an FPS data output part 310, and a frame frequency data output part 320.

The user input unit 130 generates input data Din in response to user input. The program execution part 300 receives the input data Din from the user input unit 130, and runs a program in response to the input data Din. If the user gives input to run any one of the programs on the mobile terminal 100, for example, a camera, the program execution part 300 runs the camera's program.

To display information on a running program on the display module 151, the program execution part 300 provides the FPS data output part 310 and the display module 151 with digital image data DATA, which is stored in the memory unit 160 and corresponds to the running program, and timing signals.

The FPS data output part 310 receives the digital image data DATA and the timing signals. The FPS data output part 310 analyzes the digital image data DATA and the timing signals to calculate FPS data Dfps indicative of FPS (frames per second) rate and outputs it. The FPS data Dfps denotes the number of frames per second.

The frame frequency data output part 320 receives the FPS data Dfps. The frame frequency data output part 320 calculates frame frequency data Dfr indicative of the frame frequency of the display module 151 based on the FPS data Dfps and then outputs it to the display module 151.

The frame frequency data output part 320 may design the frame frequency data according to the characteristics of the display module 151. For example, to run the display module 151 at a frame frequency of 40 to 60 Hz, the frame frequency data output part 320 may output the frame frequency data Dfr in such a way that the display module 151 runs at a frame frequency of 40 to 60 Hz. For another example, to run the display module 151 at a frame frequency of 60 to 120 Hz, the frame frequency data output part 320 may output the frame frequency data Dfr in such a way that the display module 151 runs at a frame frequency of 60 to 120 Hz.

The display module 151 includes a display panel 200, a gate driver 210, a data driver 220, a timing controller 230, and so on. The display panel 200 may be implemented as any one of the following: a liquid crystal display (LCD), a field emission display (FED), a plasma display panel (PDP), and an organic light emitting diode (OLED). It should be noted that, although the following embodiment is illustrated with an example in which the display panel 200 is implemented as a liquid crystal display, the present invention is not limited to this example.

The display panel 200 includes an upper substrate and a lower substrate facing each other, with a liquid crystal layer between them. A pixel array is formed on the display panel 200, which includes pixels that are arranged in a matrix form by data lines D and gate lines G (or scan lines) intersecting each other. As the liquid crystals in the liquid crystal layer are driven by a voltage difference between a pixel electrode charged with a data voltage through a thin film transistor and a common electrode to which a common voltage is applied, the amount of light transmission is adjusted, thus allowing each pixel to display an image.

A black matrix and color filters are formed on the upper substrate of the display panel 200. For a vertical electric field driving type, such as twisted nematic (TN) mode or vertical alignment (VA) mode, the common electrode is formed on the upper substrate. For a horizontal electric field driving type, such as in-plane switching (IPS) mode or fringe field switching (FFS) mode, the common electrode and the pixel electrode may be formed together on the lower substrate. The display panel 200 may be implemented in any liquid crystal mode as well as the TN mode, VA mode, IPS mode, and FFS mode. Polarizers are respectively attached to the upper and lower substrates of the liquid display panel, and an alignment film for setting a pre-tilt angle of liquid crystals is formed on them. A spacer for maintaining the liquid crystal layer's cell gap is formed between the upper and lower substrates of the display panel 200.

The display panel 200 may be implemented in any form including a transmissive liquid crystal display panel, a semi-transmissive liquid crystal display panel, and a reflective liquid crystal display panel. The transmissive liquid crystal display panel and the semi-transmissive liquid crystal display panel require a backlight unit. The backlight unit may be implemented as a direct-type backlight unit or an edge-type backlight unit.

The gate driver 210 sequentially supplies the gate lines G with gate pulses for the display panel 200, in response to a gate control signal GCS from the timing controller 230.

The data driver 220 converts digital image data DATA' to analog data voltages in response to a data control signal DCS from the timing controller 230, and synchronizes the data voltages with the gate pulses and supplies them to the data lines D of the display panel 200.

The timing controller 230 receives digital image data DATA and timing signals. The timing signals may include a vertical synchronization signal, a horizontal synchronization signal, a data enable signal, a dot clock, etc. Also, the timing controller 230 receives frame frequency data Dfr indicative of frame frequency from the controller 180.

The timing controller 230 generates gate control signals GCS for controlling the operation timing of the gate driver 210 and data control signals DCS for controlling the operation timing of the data driver 220, based on the frame frequency indicated by the frame frequency data Dfr and the timing signals. The timing signals include a vertical synchronization signal, a horizontal synchronization signal, a data enable signal, a dot clock, etc. A detailed description of a method for the timing controller 230 to adjust frame frequency will be given in conjunction with FIGS. 7, 8A, and 8B.

The timing controller 230 outputs the gate control signals GCS to the gate driver 210, and outputs the digital image data DATA and the data control signals DCS to the data driver 220. The gate control signals GCS may include a gate start pulse, gate shift clocks, and a gate output enable signal. The gate start pulse controls the timing of a first gate pulse. The gate shift clocks are clock signals for shifting the gate start pulse. The gate output enable signal controls the output timing of the gate driver 210. The data control signals DCS include a source start pulse, a source sampling clock, a source output enable signal, a polarity control signal, etc. The source start pulse controls the timing of the start of data sampling by the data driver 220. The source sampling clock is a clock signal that controls the sampling operation of the data driver 220 based on a rising or falling edge. The source start pulse and the source sampling clock may be omitted from the mini-LVDS (low voltage differential signaling) interface specification. The polarity control signal inverts the polarity of data voltages output from the data driver 220 every L (L is a natural number) horizontal periods. The source output enable signal controls the output timing of the data driver 220.

Figure 5:
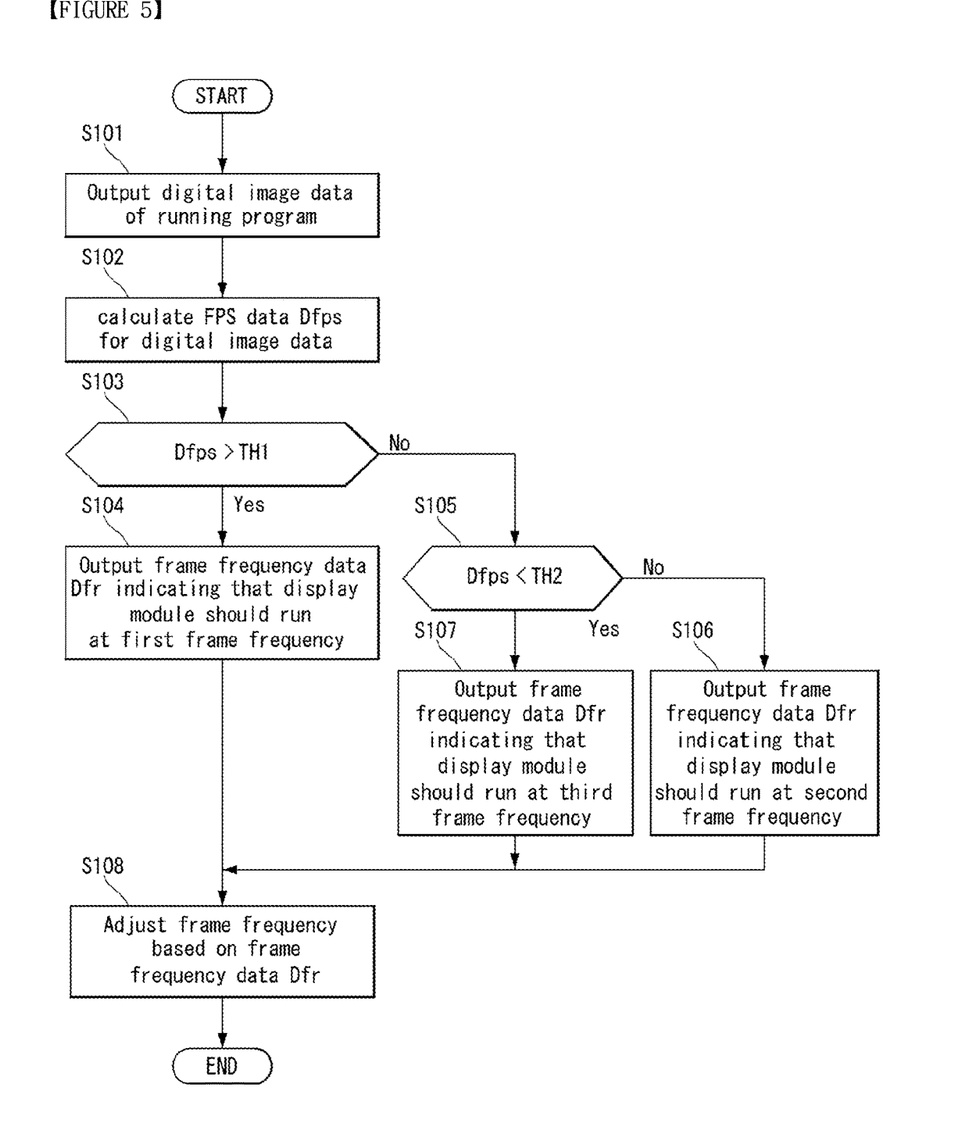
FIG. 5 is a flowchart showing in detail a method for the controller to control frame frequency according to the first embodiment of the present invention.

FIG. 5 is a flowchart showing in detail a method for the controller to control frame frequency according to the first embodiment of the present invention. In the first embodiment of the present invention, as shown in FIG. 5, the power consumption of the display module 151 may be reduced by adjusting the frame frequency of the display module 151. Hereinafter, the method for the controller 180 to control frame frequency according to the first embodiment of the present invention will be described in detail with reference to FIGS. 4 and 5.

Referring to FIG. 5, first, the program execution part 300 receives input data Din from the user input unit 130. The program execution part 300 runs a program corresponding to the input data, and outputs digital image data DATA stored in the memory and timing signals to the FPS data output part 310, in order to display the program (S101).

Second, the FPS data output part 310 receives the digital image data DATA and the timing signals from the program execution part 300. The FPS data output part 310 analyzes the digital image data DATA and the timing signals to calculate FPS data Dfps, and outputs the FPS data Dfps to the frame frequency data output part 320. The FPS data Dfps denotes the number of frames per second.

Figure 6:
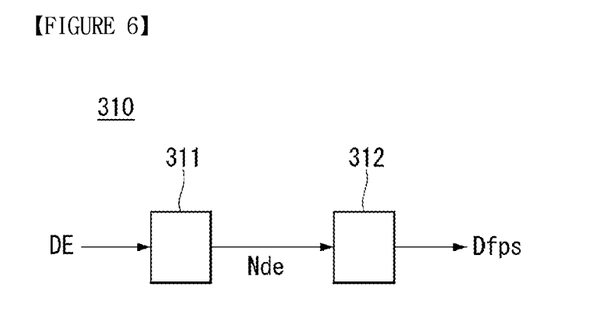
FIG. 6 is a block diagram showing in detail an FPS data output part.

Specifically, the FPS data output part 310 may calculate the FPS data Dfps by counting the number of data enable signals for a predetermined period of time. More specifically, the FPS data output part 310 may calculate the FPS data Dfps by counting the number of data enable signals and dividing the count Nde of data enable signals by the number of data enable signals for 1 frame. In this case, the FPS data output par 310 may include a counter 311 for counting the number of data enable signals and a calculator 312 for dividing the count of data enable signals by the number of data enable signals for 1 frame. If the display module 151 includes 1920×1080 pixels, for example, the number of data enable signals for 1 frame may be 1080. In this case, the FPS data output part 310 may calculate the FPS data Dfps by dividing the count of data enable signals by 1080 (S102).

Third, the frame frequency data output part 320 receives the FPS data Dfps from the FPS data output part 310. The frame frequency data output part 320 outputs frame frequency data Dfr indicative of frame frequency to the timing controller 230 of the display module 151, based on the FPS data Dfps.

Specifically, if the FPS data Dfps is equal to or greater than a first threshold TH1, the frame frequency data output part 320 outputs frame frequency data Dfr indicating that the display module 151 should run at a first frame frequency FR1. If the FPS data Dfps is less than the first threshold TH1 and equal to or greater than a second threshold TH2, the frame frequency data output part 320 outputs frame frequency data Dfr indicating that the display module 151 should run at a second frame frequency FR2. If the FPS data Dfps is less than the second threshold TH2, the frame frequency data output part 320 outputs frame frequency data Dfr indicating that the display module 151 should run at a third frame frequency FR3. In this instance, if the display module 151 runs at a frame frequency of 40 to 60 Hz, the first frame frequency FR1 may be 60 Hz, the second frame frequency FR2 may be 50 Hz, and the third frame frequency FR3 may be 40 Hz. For another example, if the display module 151 runs at a frame frequency of 60 to 120 Hz, the first frame frequency FR1 may be 120 Hz, the second frame frequency FR2 may be 90 Hz, and the third frame frequency FR3 may be 60 Hz (S103 to S107).

Fourth, the timing controller 230 of the display module 151 receives the frame frequency data Dfr from the frame frequency data output part 320. The timing controller 230 adjusts the frame frequency of the display module 151 based on the frame frequency data Dfr. A detailed description of a method for the timing controller 230 to adjust frame frequency will be given later in conjunction with FIGS. 7, 8A, and 8B (S108).

As discussed above, in the first embodiment of the present invention, FPS data Dfps indicative of the FPS rate for a currently running program is calculated, and the frame frequency of the display module 151 is adjusted based on the FPS data Dfps. The present invention can achieve a reduction in power consumption by adjusting the frequency of the display module 151 to a lower level when some programs are run.

Figure 7:
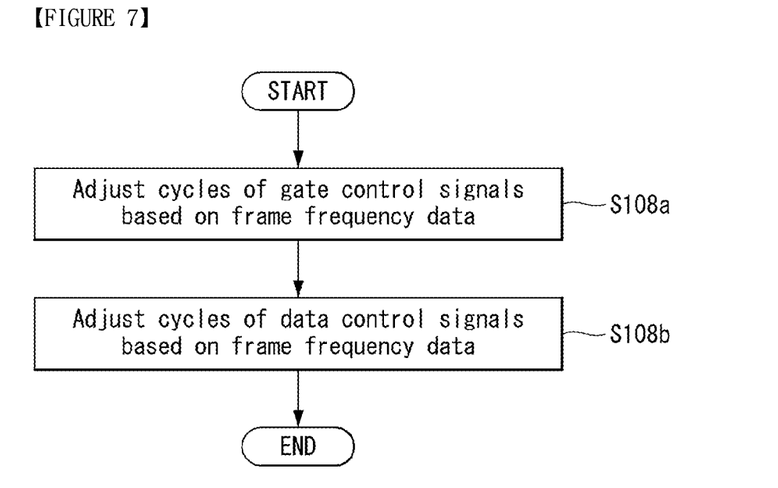
FIG. 7 is a flowchart showing in detail a method for a timing controller to adjust frame frequency according to an embodiment of the present invention.

FIG. 7 is a flowchart showing in detail a method for a timing controller to adjust frame frequency according to an embodiment of the present invention. The timing controller 230 receives frame frequency data Dfr indicative of frame frequency from the frame frequency data output part 320. The timing controller 230 adjusts the frame frequency of the display module based on the frame frequency data Dfr. Hereinafter, a method for the timing controller 230 to adjust frame frequency will be described in detail with reference to FIG. 7.

Figure 8A:
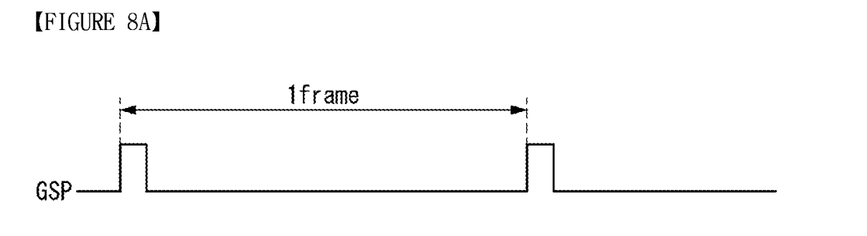
FIG. 8A is a view showing an example of a gate start pulse for a display module running at a first frame frequency.
Figure 8B:
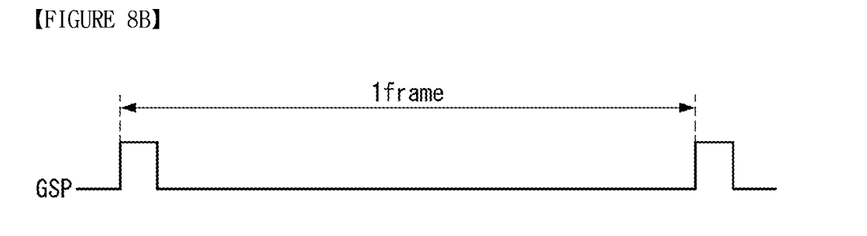
FIG. 8B is a view showing an example of a gate start pulse for a display module running at a second frame frequency.

First, the timing controller 230 adjusts the cycles of the gate control signals GCS, that is, the cycle of the gate start pulse GSP, the cycle of the gate shift clocks, and the cycle of the gate output enable signal, based on the frame frequency data Dfr, in order to adjust the frame frequency of the display module. FIGS. 8A and 8B are views showing an example of a gate start pulse for a first frame frequency and an example of a gate start pulse for a second frame frequency. As shown in FIGS. 8A and 8B, the cycle of the gate start pulse GSP for the first frame frequency is adjusted to be shorter than the cycle of the gate start pulse GSP for the second frame frequency. Also, the cycle of the gate shift clocks and the cycle of the gate output enable signal are adjusted to be shorter for the first frame frequency than for the second frame frequency (S108a).

Second, the timing controller 230 adjusts the cycle of the digital image data DATA based on the frame frequency data Dfr. Also, the timing controller 230 adjusts the cycles of the data control signals DCS, that is, the cycle of the source start pulse, the cycle of the source sampling clock, the cycle of the source output enable signal, and the cycle of the polarity control signal, based on the frame frequency data Dfr. For example, the cycle of the digital image data DATA, the cycle of the source start pulse, the cycle of the source sampling clock, the cycle of the source output enable signal, and the cycle of the polarity control signal may be adjusted to be shorter for the first frame frequency FR1 than for the second frame frequency FR2 (S108b).

Figure 9:
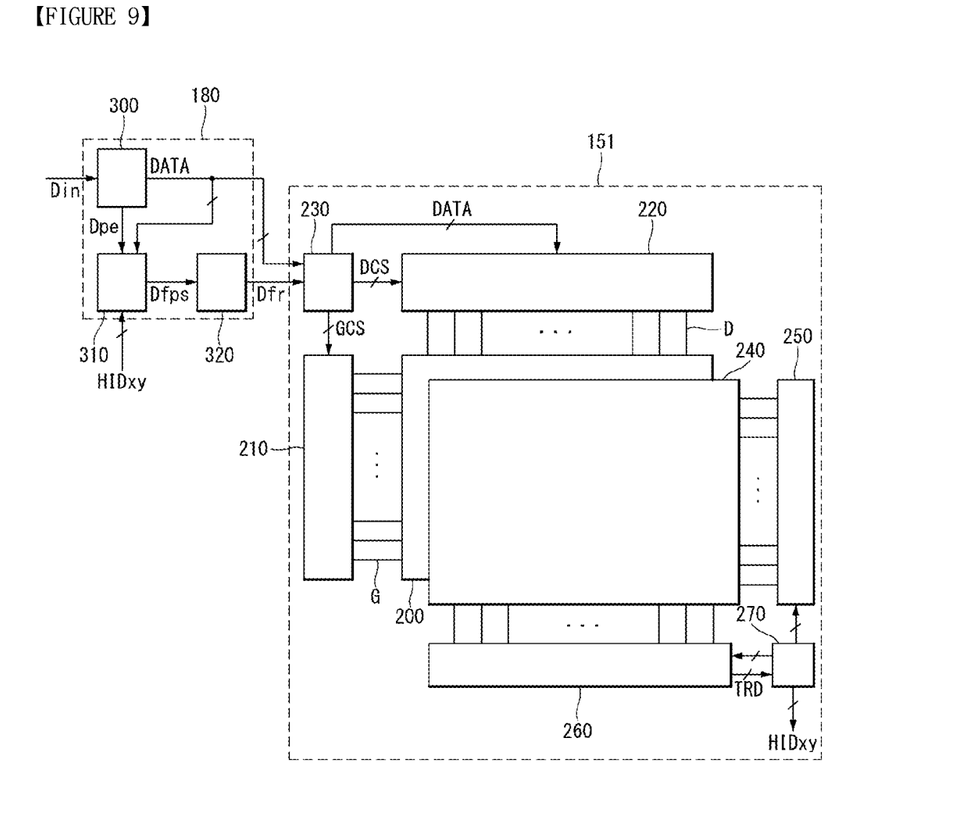
FIG. 9 is a block diagram showing in detail part of a controller and a display module according to a second embodiment of the present invention.

FIG. 9 is a block diagram showing in detail part of a controller and a display module according to a second embodiment of the present invention. Referring to FIG. 9, the controller 180 according to the second embodiment of the present invention includes a program execution part 300, an FPS data output part 310, and a frame frequency data output part 320.

The user input unit 130 generates input data Din in response to user input. The program execution part 300 receives the input data Din from the user input unit 130, and runs a program in response to the input data Din. If the user gives input to run any one of the programs on the mobile terminal 100, for example, a camera, the program execution part 300 runs the camera's program.

To display information on a running program on the display module 151, the program execution part 300 provides the FPS data output part 310 and the display module 151 with digital image data DATA, which is stored in the memory unit 160 and corresponds to the running program, and timing signals. Also, the program execution part 300 outputs program execution data Dpe indicative of which program is running to the FPS data output part 310. The program execution part 300 may perform multitasking to run multiple programs simultaneously. In this case, the program execution part 300 may output to the FPS data output part 310 program execution data Dpe corresponding to a program currently displayed through the display module 151.

The FPS data output part 310 receives the program execution data Dpe and the digital image data DATA from the program execution part 300. The FPS data output part 310 may include a look-up table that receives the program execution data Dpe as an input address and outputs the FPS data Dfps stored in the input address. In this case, if the program execution data Dpe is included as an input address in the look-up table, the FPS data output part 310 may output to the frame frequency data output part 320 the FPS data Dfps stored in the input address corresponding to the program execution data Dpe. If the program execution data Dpe is not included as an input address in the look-up table, the FPS data output part 310 may analyze the digital image data DATA and the timing signals to calculate the FPS data Dfps.

Also, the FPS data output part 310 receives touch coordinate data HIDxy from a touch controller 270. The FPS data output part 310 may analyze the touch coordinate data HIDxy to determine if a touch has occurred. If a touch from the user has occurred, the FPS data output part 310 may output the FPS data Dfps indicative of the maximum FPS rate, regardless of whether the program execution data Dpe is included as an input address of the look-up table.

The frame frequency data output part 320 is substantially identical to that explained in conjunction with FIG. 4, so a description of it will be omitted.

The display module 151 includes a display panel 200, a gate driver 210, a data driver 220, a timing controller 230, a touch panel 240, a Tx drive circuit 250, an Rx drive circuit 260, and a touch controller 270. The display panel 200, gate driver 210, data driver 220, timing controller 230, touch panel 240, Tx drive circuit 250, Rx drive circuit 260, and touch controller 270 of the display module 151 according to the second embodiment of the present invention are substantially identical to those explained in conjunction with FIG. 4, so a description of them will be omitted.

The touch panel 240 includes Tx lines T, Rx lines R intersecting the Tx lines T, and touch sensors formed at the intersections of the Tx lines T and the Rx lines R. It should be noted that, although each touch sensor may be implemented as a mutual capacitance from an equivalent circuit perspective, the present invention is not limited thereto.

The touch panel 240 may be bonded onto the top of the display panel 200. Particularly, if the display panel 200 is implemented as a liquid crystal display, the touch panel 240 may be bonded onto the upper polarizer of the display panel 200 or between the upper polarizer and the upper substrate of the display panel 200. Also, the touch sensors of the touch panel 240 may be formed on the lower substrate, together with the pixel array within the display panel 200 (in-cell type).

The Tx drive circuit 250 selects a Tx channel to output driving pulses under the control of the touch controller 270, and supplies driving pulses to the TX lines connected to the selected Tx channel. The Rx drive circuit 260 selects an Rx channel to receive the difference in electric charge at the touch sensors through the Rx lines connected to the selected Rx channel. The Rx drive circuit 260 samples the difference in electric charge at the touch sensors received through the Rx lines Rx, and accumulates it in an integrator. The Rx drive circuit 260 feeds the voltage accumulated in the integrator to an analog-to-digital converter ADC and converts it to touch raw data TRD, which is digital data, and outputs the touch raw data TRD.

The touch controller 270 generates a Tx setup signal for setting a Tx channel through which the Tx drive circuit 250 outputs driving pulses and an Rx setup signal for setting an Rx channel through which the Rx drive circuit 260 receives a touch sensor voltage. Also, the touch controller 270 generates timing control signals for controlling the operation timings of the Tx drive circuit 250 and Rx drive circuit 260. The touch controller 270 receives touch raw data TRD from the Rx drive circuit 260. The touch controller 270 calculates a touch coordinate(s) according to a touch coordinate calculation method according to an embodiment of the present invention, and outputs touch coordinate data HIDxy containing information on the touch coordinate(s) to the controller 180.

Figure 10:
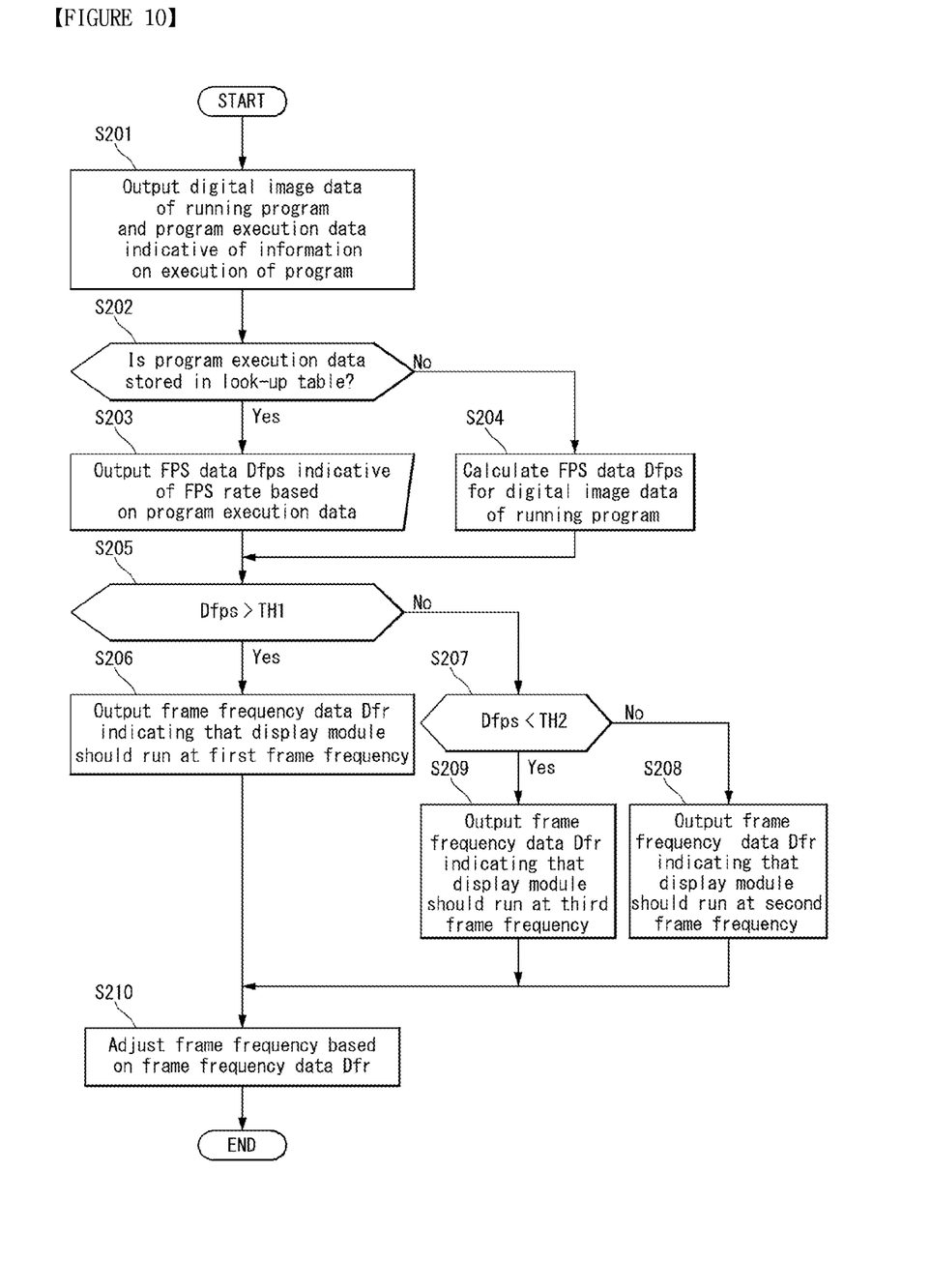
FIG. 10 is a flowchart showing in detail a method for the controller to control frame frequency according to the second embodiment of the present invention.

FIG. 10 is a flowchart showing in detail a method for the controller to control frame frequency according to the second embodiment of the present invention. The second embodiment of the present invention allows for a reduction in the power consumption of the display module 151 by controlling the frame frequency of the display module as shown in FIG. 10. Hereinafter, a method for controlling the frame frequency of the display module 151 according to the second embodiment of the present invention will be described in detail with reference to FIGS. 9 and 10.

Referring to FIG. 10, first, the program execution part 300 receives input data Din from the user input unit 130. The program execution part 300 runs a program corresponding to the input data, and outputs digital image data DATA stored in the memory and timing signals to the FPS data output part 310, in order to display the program. Also, the program execution part 300 outputs program execution data Dpe indicative of information on the execution of the program to the FPS data output part 310 (S201).

Second, the FPS data output part 310 receives the program execution data Dpe and the digital image data DATA from the program execution part 300, and receives touch coordinate data HIDxy from the touch controller 270.

The FPS data output part 310 may include a look-up table that receives the program execution data Dpe as an input address and outputs the FPS data Dfps stored in the input address. In this case, if the program execution data Dpe is included as an input address in the look-up table, the FPS data output part 310 may output to the frame frequency data output part 320 the FPS data Dfps stored in the input address corresponding to the program execution data Dpe.

If the program execution data Dpe is not included as an input address in the look-up table, the FPS data output part 310 may analyze the digital image data DATA and the timing signals to calculate the FPS data Dfps. Specifically, if the FPS data output part 310 does not receive the program execution data Dpe stored in the look-up table, it may output the FPS data Dfps in substantially the same manner as explained in the step S102.

Figure 11:
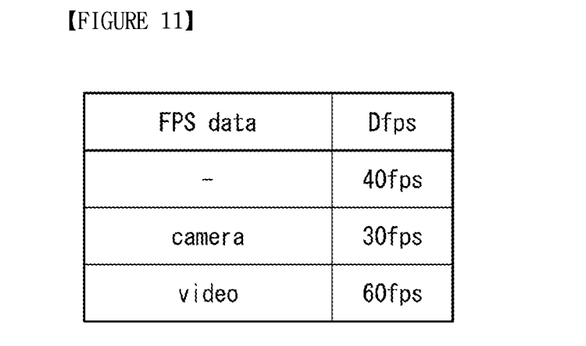
FIG. 11 is an example of a look-up table storing FPS data for at least one program according to the second embodiment of the present invention.

That is to say, by storing FPS data Dfps for a particular program in the look-up table, the second embodiment of the present invention enables the FPS data Dfps to be output immediately using the look-up table, rather than to be calculated as in the step S102, when the particular program is run. Referring to FIG. 11, the second embodiment of the present invention may be implemented in such a manner as to output FPS data Dfps indicative of 30 fps if a running program is a camera or to output FPS data Dfps indicative of 60 fps if the running program is a video. Consequently, in the second embodiment of the present invention, programs that are sensitive to deterioration in picture quality and require a higher frame frequency and programs that are less sensitive to deterioration in picture quality and can work at a lower frame frequency are both pre-stored in the look-up table, and the frame frequency of the display module is adjusted to a lower level if the latter programs are run. Thus, the power consumption of the mobile terminal can be reduced (S202 to S204).

The FPS data output part 310 may analyze the touch coordinate data HIDxy received from the touch controller 270 to determine if a touch from the user has occurred. If a touch from the user has occurred, the FPS data output part 310 may output the FPS data Dfps indicative of the maximum FPS rate, regardless of whether the program execution data Dpe is included as an input address of the look-up table.

The screen is usually converted into program execution if a touch from the user occurs. Therefore, in the second embodiment of the present invention, the frame frequency of the display module 151 may be controlled to a higher level by outputting the FPS data Dfps indicative of the maximum FPS rate. Consequently, the second embodiment of the present invention makes the screen conversion smoother.

Third, the frame frequency data output part 320 receives the FPS data Dfps from the FPS data output part 310. The frame frequency data output part 320 outputs frame frequency data Dfr indicative of frame frequency to the timing controller 230 of the display module 151, based on the FPS data Dfps. The steps S205 to S209 according to the second embodiment of the present invention are substantially identical to the steps S103 to S107 explained in conjunction with FIG. 5, so a detailed description thereof will be omitted (S205 to S209).

Fourth, the timing controller 230 of the display module 151 receives the frame frequency data Dfr from the frame frequency data output part 320. The timing controller 230 adjusts the frame frequency of the display module 151 based on the frame frequency data Dfr. A detailed description of a method for the timing controller 230 to adjust frame frequency has been given in conjunction with FIGS. 7, 8A, and 8B (S210).

As discussed above, in the second embodiment of the present invention, FPS data Dfps indicative of the FPS rate for a currently running program is calculated, and the frame frequency of the display module 151 is adjusted based on the FPS data Dfps. Particularly, in the second embodiment of the present invention, programs that are sensitive to deterioration in picture quality and require a higher frame frequency and programs that are less sensitive to deterioration in picture quality and can work at a lower frame frequency are both pre-stored in the look-up table, and the frame frequency of the display module is adjusted to a lower level if the latter programs are run. Thus, the power consumption of the mobile terminal can be reduced.

The screen is usually converted into program execution if a touch from the user occurs. Therefore, in the second embodiment of the present invention, the frame frequency of the display module 151 may be controlled to a higher level by outputting the FPS data Dfps indicative of the maximum FPS rate, regardless of whether the program execution data Dpe is included as an input address of the look-up table. Consequently, the second embodiment of the present invention makes the screen conversion smoother.

From the above description, those skilled in the art to which the present invention pertains will appreciate that various changes and modifications are possible without departing from the technical spirit of the present invention. Accordingly, the technical scope of this invention is not limited to what is described above, but rather defined by the appended claims.

INDUSTRIAL APPLICABILITY

The present invention is applicable in the industry of mobile terminals.

The invention claimed is:

1. A mobile terminal comprising:
a display configured to display information; and
a controller configured to:
  calculate frames per second (FPS) data indicative of an FPS rate for a running program; and
  control a frame frequency of the display based on the FPS data,
wherein the controller comprises:
  a program execution part configured to run the program and output digital image data of the program, which is stored in a memory, and timing signals;
  an FPS data output part configured to analyze the digital image data and the timing signals and calculate and output the FPS data indicative of the FPS rate; and
  a frame frequency output part configured to output frame frequency data indicative of the frame frequency of the display based on the FPS data,
wherein the FPS data output part comprises a look-up table configured to receive program execution data as an input address and output the FPS data stored in the input address, and
wherein the FPS data output part is further configured to:
  determine the frame frequency based on whether the program execution data is included as an input address in the look-up table; and
  output FPS data indicative of a maximum FPS rate when a touch of the display occurs, regardless of whether the program execution data is included as an input address of the look-up table.

2. The mobile terminal of claim 1, wherein:
when the program execution data is included as an input address in the look-up table, the FPS data output part outputs to the frame frequency data output part the FPS data stored in the input address corresponding to the program execution data; and
when the program execution data is not included as an input address in the look-up table, the FPS data output part analyzes the digital image data and the timing signals to calculate the FPS data and output the same to the frame frequency data output part.

3. The mobile terminal of claim 1, wherein:
when the FPS data is equal to or greater than a first threshold, the frame frequency data output part outputs frame frequency data indicating that the display should run at a first frame frequency;
when the FPS data is less than the first threshold and equal to or greater than a second threshold, the frame frequency data output part outputs frame frequency data indicating that the display should run at a second frame frequency; and
when the FPS data is less than the second threshold, the frame frequency data output part outputs frame frequency data indicating that the display should run at a third frame frequency.

4. The mobile terminal of claim 1, wherein the display comprises:
a display panel comprising data lines and gate lines intersecting the data lines;
a data driver configured to supply data voltages to the data lines;
a gate driver configured to sequentially supply gate pulses to the gate lines; and
a timing controller configured to supply the gate driver with gate control signals for controlling the output timing of the gate pulses and supply the data driver with the digital image data and data control signals for controlling the output timing of the data voltages.

5. The mobile terminal of claim 4, wherein the timing controller adjusts cycles of the gate control signals and cycles of the data control signals based on the frame frequency data.

6. A method of driving a mobile terminal, the method comprising:
displaying information on a display;
calculating frames per second (FPS) data indicative of an FPS rate for a running program and controlling a frame frequency of the display based on the FPS data;
running the program and outputting program execution data indicative of information on the execution of the program, digital image data of the program, which is stored in a memory, and timing signals;
analyzing the digital image data and the timing signals, and calculating and outputting the FPS data indicative of the FPS rate; and
outputting frame frequency data indicative of the frame frequency of the display based on the FPS data,
wherein the calculating and outputting of FPS data comprises:
receiving the program execution data as an input address and outputting the FPS data stored in the input address;
determining the frame frequency based on whether the program execution data is included as an input address in the look-up table; and
outputting FPS data indicative of a maximum FPS rate when a touch of the display occurs, regardless of whether the program execution data is included as an input address of the look-up table.

7. The method of claim 6, wherein, in the calculating and outputting of FPS data, when the program execution data is included as an input address in the look-up table, the FPS data stored in the input address corresponding to the program execution data is output, and
wherein, in the calculating and outputting of FPS data, when the program execution data is not included as an input address in the look-up table, the digital image data and the timing signals are analyzed to calculate and output the FPS data.

8. The method of claim 6, wherein, in the outputting of frame frequency data, when the FPS data is equal to or greater than a first threshold, frame frequency data indicating that the display should run at a first frame frequency is output,
wherein, in the outputting of frame frequency data, when the FPS data is less than the first threshold and equal to or greater than a second threshold, frame frequency data indicating that the display should run at a second frame frequency is output, and
wherein, in the outputting of frame frequency data, when the FPS data is less than the second threshold, frame frequency data indicating that the display should run at a third frame frequency is output.

9. The method of claim 6, wherein the displaying of information on the display comprises:
supplying data voltages to data lines of the display panel;
sequentially supplying gate pulses to gate lines of the display panel; and
supplying gate control signals for controlling the output timing of the gate pulses and supplying the digital image data and data control signals for controlling the output timing of the data voltages.

10. The method of claim 9, wherein, in the supplying of gate controls signals for controlling the output timing of the gate pulses and the supplying of the digital image data and data control signals for controlling the output timing of the data voltages, cycles of the gate control signals and cycles of the data control signals are adjusted based on the frame frequency data.

* * * * *